(12) United States Patent
Takahashi

(10) Patent No.: US 9,106,636 B2
(45) Date of Patent: Aug. 11, 2015

(54) INFORMATION AUTHENTICATION METHOD AND INFORMATION AUTHENTICATION SYSTEM

(75) Inventor: Kenta Takahashi, Yokohama (JP)

(73) Assignee: HITACHI, LTD., Tokyo (JP)

( * ) Notice: Subject to any disclaimer, the term of this patent is extended or adjusted under 35 U.S.C. 154(b) by 166 days.

(21) Appl. No.: 13/876,267

(22) PCT Filed: Oct. 29, 2010

(86) PCT No.: PCT/JP2010/069371
§ 371 (c)(1),
(2), (4) Date: May 2, 2013

(87) PCT Pub. No.: WO2012/056582
PCT Pub. Date: May 3, 2012

(65) Prior Publication Data
US 2013/0212645 A1     Aug. 15, 2013

(51) Int. Cl.
| | |
|---|---|
| *H04L 9/32* | (2006.01) |
| *H04L 29/06* | (2006.01) |
| *H04L 9/30* | (2006.01) |
| *G06F 21/32* | (2013.01) |

(52) U.S. Cl.
CPC ............ *H04L 63/08* (2013.01); *H04L 9/3093* (2013.01); *H04L 9/3231* (2013.01); *G06F 21/32* (2013.01)

(58) Field of Classification Search
None
See application file for complete search history.

(56) References Cited

U.S. PATENT DOCUMENTS

| | | | |
|---|---|---|---|
| 2008/0013804 A1* | 1/2008 | Moon et al. | 382/124 |
| 2009/0262990 A1* | 10/2009 | Choi et al. | 382/125 |
| 2010/0106964 A1* | 4/2010 | Hirata et al. | 713/155 |
| 2011/0200234 A1 | 8/2011 | Takahashi et al. | |
| 2012/0033807 A1* | 2/2012 | Asim et al. | 380/44 |

FOREIGN PATENT DOCUMENTS

JP     2007-293807 A     11/2007

OTHER PUBLICATIONS

Ratha et al., Cancelable Biometrics: A Case Study in Fingerprints [online], 2006 [retrieved on Nov. 29, 2014]. Retrieved from the Internet: < URL: http://ieeexplore.ieee.org/stamp/stamp.jsp?tp=&arnumber=1699857 >.*

(Continued)

*Primary Examiner* — Benjamin Lanier
*Assistant Examiner* — Malcolm Cribbs
(74) *Attorney, Agent, or Firm* — Mattingly & Malur, PC

(57) ABSTRACT

At a time of enrollment, a client terminal: generates a feature polynomial from biometric information for enrollment; multiplies the feature polynomial by a prescribed integer; stores a helper polynomial obtained by multiplying an inverse polynomial of a template polynomial, a polynomial having a small norm; and transmits the template polynomial to an authentication server. The authentication server stores the template polynomial in a storage unit. At a time of authentication, the client terminal: generates a feature polynomial from biometric information for authentication; multiplies the helper polynomial by the feature polynomial; adds a random polynomial having a small norm to the authentication polynomial; and transmits the authentication polynomial to the authentication server. The authentication server determines whether or not the biometric information for enrollment and for authentication can be authenticated, based on the result obtained by multiplying the authentication polynomial by the template polynomial.

10 Claims, 4 Drawing Sheets

(56) References Cited

OTHER PUBLICATIONS

Clancy et al., Secure Smartcard-Based Fingerprint Authentication [online], Nov. 8, 2003 [retrieved on Nov. 29, 2014]. Retrieved from the Internet: < URL: http://home.eng.iastate.edu/~daniels/cpre531/handouts/biom.pdf >.*

S. Hirata et al., "Cancelable Biometrics with Perfect Secrecy for Correlation-Based Matching", LNCS, Advances in Biometrics, Jun. 2009, vol. 5558, pp. 868-878.

S. Yang et al., "Automatic Secure Fingerprint Verification System Based on Fuzzy Vault Scheme", 2005 IEEE International Conference on Acoustics, Speech, and Signal Processing Proceedings, Mar. 18, 2005, vol. V of V, Speech Processing, pp. V.609-V.612.

K. Kojima, "Zero-Knowledge Proofs Considering Error for Secure Fingerprint Authentication", IPSJ SIG Notes, vol. 2007, No. 40, pp. 41 to 48.

K. Nagai et al., "Zero Chishiki Shomei o Mochiita Hi Taisho Shimon Ninsho", Symposium on Multimedia, Distributed, Cooperative and Mobile Systems (DICOMO) Ronbunshu, edition of the years 1997 to 2006, ver.1.1 [DVD-ROM], Aug. 31, 2006, vol. 2006, No. 6, pp. 617-620.

K. Xagawa et al., "Zero-Knowledge Protocols for NTRU", Symposium on Cryptography and Information Security 2009 (SCIS2009) [CD-ROM], Jan. 20, 2009, 3F2 Public key cryptosystem (3), 3F2-4, pp. 1 to 6.

S. Takayama et al., "Template Protection using Biometric Encryption for CELP Speaker Verification", IEICE Technical Report, Nov. 14, 2007, vol. 107, No. 345, pp. 57 to 62.

\* cited by examiner

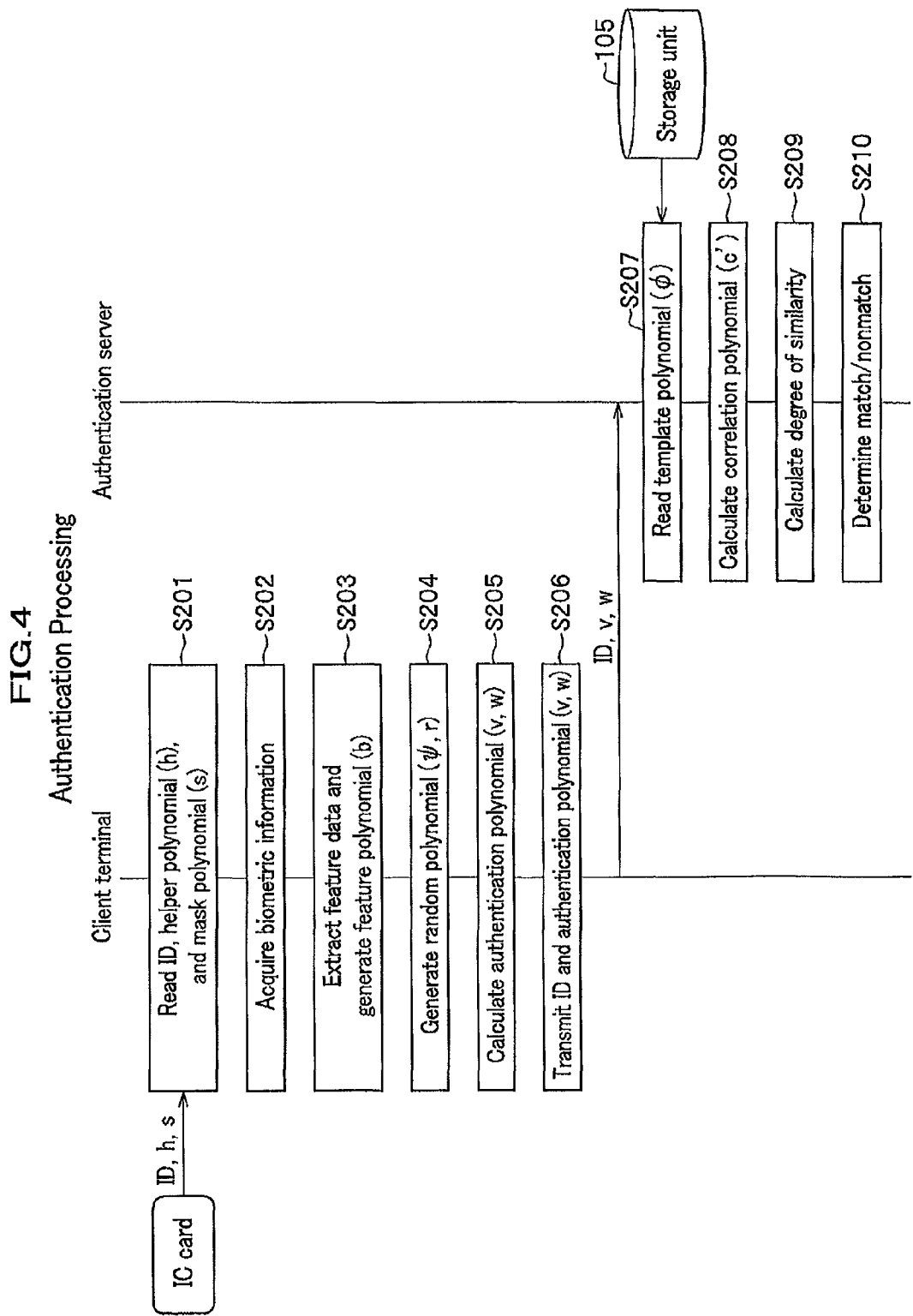

INFORMATION AUTHENTICATION METHOD AND INFORMATION AUTHENTICATION SYSTEM

TECHNICAL FIELD

The present invention relates to techniques of an information authentication method and an information authentication system.

BACKGROUND ART

An authentication system using biometric information acquires biometric information of an individual at a time of initial enrollment, extracts information referred to as a feature data from the biometric information, and enrolls the extracted feature data. The enrolled information is called a template. At a time of authentication, the authentication system acquires biometric information from the individual again, extracts a feature data from the biometric information, and verifies the newly-obtained feature data with the previously-enrolled template, to thereby determine whether or not the feature data and the template come from the same individual.

In an authentication system in which a client terminal and an authentication server are connected via a network, when an authentication server authenticates biometric information of a user transmitted from the client terminal, the authentication server typically holds a template therein. At the time of authentication, the client terminal acquires biometric information of the user, extracts a feature data from the biometric information, and transmits the feature data to the authentication server. The authentication server verifies the transmitted feature data with a template of the user, to thereby determine whether or not the feature data and the template are of the same user.

Such a template is, however, information by which an individual can be identified. This means that the template needs to be strictly controlled as personal information and thereby requires a high management cost. Even if the template is managed with strict security, not a few people are still psychologically reluctant to enroll their template due to concerns about leak of their personal information. Additionally, there is a limit to the number of variations of one kind of biometric information that one individual has (for example, fingerprints typically has only ten variations based on ten fingers. There is thus a problem that such a template cannot be easily replaced with another, unlike a password or an encryption key. There is another problem that, if a template is leaked and is put at risk of forgery, the biometric authentication based on the template cannot be used any longer. Further, if one same biometric information is enrolled at different systems and is leaked from one of those systems, the other systems are also exposed to threat.

In light of the above, a method is proposed in which: at a time of enrollment, a feature data of biometric information is transformed by a given function (a type of encryption) and a secret parameter held by a client terminal (a type of encryption key), and the transformed feature data is stored in an authentication server as a template of which original information is kept confidential; and, at a time of authentication, a feature data of the biometric information is newly extracted by the client terminal, the extracted feature data is transformed with the same function and parameter as those used at the time of enrollment, the transformed feature is transmitted to the authentication server, and the received feature data is verified with the template while both are kept in the transformed states (the method is called cancelable biometrics).

In the above-described method, the client terminal keeps a transformation parameter secret, which makes the original feature data unknown to the authentication server even at the time of authentication. This allows privacy of individuals to be protected. Or, even if the template is leaked, security of the private information can be protected by changing the transformation parameter and newly creating and enrolling another template. Further, even if one same biometric information is used at different systems, different templates can be created from the one same biometric information by transforming using different parameters and enrolling the different templates. This can prevent security of the other systems from being decreased, even if any one of the templates is leaked.

A specific method of realizing such cancelable biometrics depends on a type of biometric information or verification algorithm.

For example, Patent Document 1 shown below discloses a biometric authentication method and a system implementation method (to be hereinafter referred to as correlation invariant random filtering) which is applicable to a biometric authentication technique in which a degree of similarity is determined based on a correlation value of a feature data (an image) such as vein authentication.

In the technique described in Patent Document 1, at a time of enrollment, a client terminal makes a feature data image x extracted from biometric information of a user subjected to basis transformation (Fourier transform or number theoretic transform), to thereby calculate a basis-transformed image X, to which a randomly-generated transform filter K is subjected. The client terminal then calculates $T[i]=X[i]/K[i]$ for each i-th pixel, to thereby create a transform image T and enroll the created transform image T in an authentication server. The user carries the transform filter K by storing in an IC (Integrated Circuit) card or the like.

At a time of authentication, the client terminal newly extracts a feature data image y from biometric information of the user, sorts the extracted pixels in reverse order with respect to a vertical direction and a horizontal direction, and performs basis transformation on the pixels, to thereby calculate a basis transformation image Y. The client terminal transforms the basis transformation image Y using the transform filter K read from the user's IC card, calculates $V[i]=Y[i] \times K[i]$ for each i-th pixel, thereby creates a transform image V, and transmits the transform image V to the authentication server. The authentication server calculates $C[i]=T[i] \times V[i]$ $(=X[i] \times Y[i])$ for each of the pixels, performs inverse basis transformation (inverse Fourier transform or inverse number theoretic transform) on the image C, and thereby calculate a value of mutual correlation between x and y. The authentication server then calculates a degree of similarity between x and y based on the value of mutual correlation, to thereby determine a match/nonmatch.

RELATED ART DOCUMENT

Patent Document

[Patent Document 1] Japanese Laid-Open Patent Application, Publication No. 2007-293807

SUMMARY OF THE INVENTION

Problem to be Solved by the Invention

The technique described in Patent Document 1 discloses that the feature data images x, y are transformed by a secret transform filter K and are then transmitted to the authentication server. This allows the feature data images x, y to be kept secret to the authentication server when the authentication server performs a verification processing.

However, if a server administrator maliciously attempts to decode the feature data images x, y, there is a possibility that the decoding results in success by using some portion of the information on the feature data images x, y.

For example, if one user repeatedly performs authentication, the malicious server administrator can write a simultaneous equation with respect to each pixel value of the basis transformation image Y, based on relationship between plural data each transmitted to the authentication server.

More specifically, if, for example, the authentication is repeated m times and let feature data images extracted in each authentication be referred to as y1, y2, . . . ym. Let basis transformation images corresponding to the feature data images sorted in reverse order be referred to as Y1, Y2, . . . , Ym. Then, the data transmitted to the authentication server become as follows: V1=Y1×K, V2=Y2×K, . . . , Vm=Ym×K, . . . . The authentication server can therefore calculate V1/V2, V1/V3, . . . , V1/Vm. Herein, V1/Vi=Y1/Yi, which can be transformed into:

$$V1Yi=ViY1$$

Yi herein is what the original feature data image yi has been subjected to the basis transformation (linear transform) and is represented by a linear combination of each pixel value of yi. Thus, the above expression can be regarded as a simultaneous linear equation having the each pixel value of yi as an unknown. Putting together of i=2, 3, . . . , m makes a simultaneous equation with (m−1)N unknowns with respect to mN unknowns.

The above-described simultaneous equation as it is cannot be uniquely solved because the number of the unknowns is larger than the number of equations. However, if an attacker (a wiretapper of the communication channel, a malicious server administrator, or the like) knows some portion of the information on x, y, such as, for example, information that a peripheral part of an image of interest constantly has a background color, the number of the unknowns is reduced. This in turn increases a possibility that the equation can be uniquely solved, that is, decodable.

The present invention has been made in light of the above-described background and in an attempt to perform information authentication in which original information is kept secret at a high level.

Means for Solving the Problems

To solve the above-described problems, the present invention provides an information authentication method in an authentication of information performed by a client terminal and an authentication server. The information authentication method includes:

at a time of enrollment, the steps, performed by the client terminal, of acquiring information for enrollment via an input unit; generating a first feature polynomial based on the information for enrollment; generating a template polynomial that has an inverse polynomial which is modulo a prescribed integer and a prescribed polynomial and which is an inverse with respect to a modular multiplication of a polynomial, and that has a norm equal to or smaller than a preset value; calculating a helper polynomial by multiplying the first feature polynomial by the inverse polynomial of the template polynomial and a prescribed integer; storing the helper polynomial in a storage part of the client terminal itself and transmitting the template polynomial to the authentication server; and the step, performed by the authentication server upon receipt of the template polynomial, of storing the received template polynomial in a storage medium; and, at a time of authentication, the steps, performed by the client terminal, of acquiring information for authentication via the input part; generating a second feature polynomial based on the information for authentication; generating a first random polynomial which has a norm equal to or smaller than a preset value; calculating a first authentication polynomial by multiplying the helper polynomial by the second feature polynomial and adding the first random polynomial to the multiplication result; transmitting the first authentication polynomial to the authentication server; and the steps, performed by the authentication server upon receipt of the first authentication polynomial, of multiplying the first authentication polynomial by the inverse polynomial of the template polynomial and dividing the multiplication result by the prescribed integer; and determining a match or a nonmatch between the information for enrollment and the information for authentication, based on the division result.

Herein, a norm in a polynomial means a maximum value of an absolute value of a coefficient of the polynomial.

Other means for solving the problems are described in an embodiment according to necessity.

Advantageous Effects of the Invention

With the present invention, information authentication in which original information is kept secret at a high level can be performed.

BRIEF DESCRIPTION OF THE DRAWINGS

FIG. 4 is a flowchart illustrating steps of an authentication processing according to the embodiment.

EMBODIMENT FOR CARRYING OUT THE INVENTION

Next is described in detail an embodiment for carrying out the present invention (to be simply referred to as an "embodiment" hereinafter) with reference to related drawings.

In this embodiment, description is made taking an example of a biometric authentication system in which: a feature data of biometric information is transformed; and the biometric information is verified in an authentication server using the transformed feature data, while the biometric information is kept secret from the authentication server.

<System Configuration>

Figure 1:
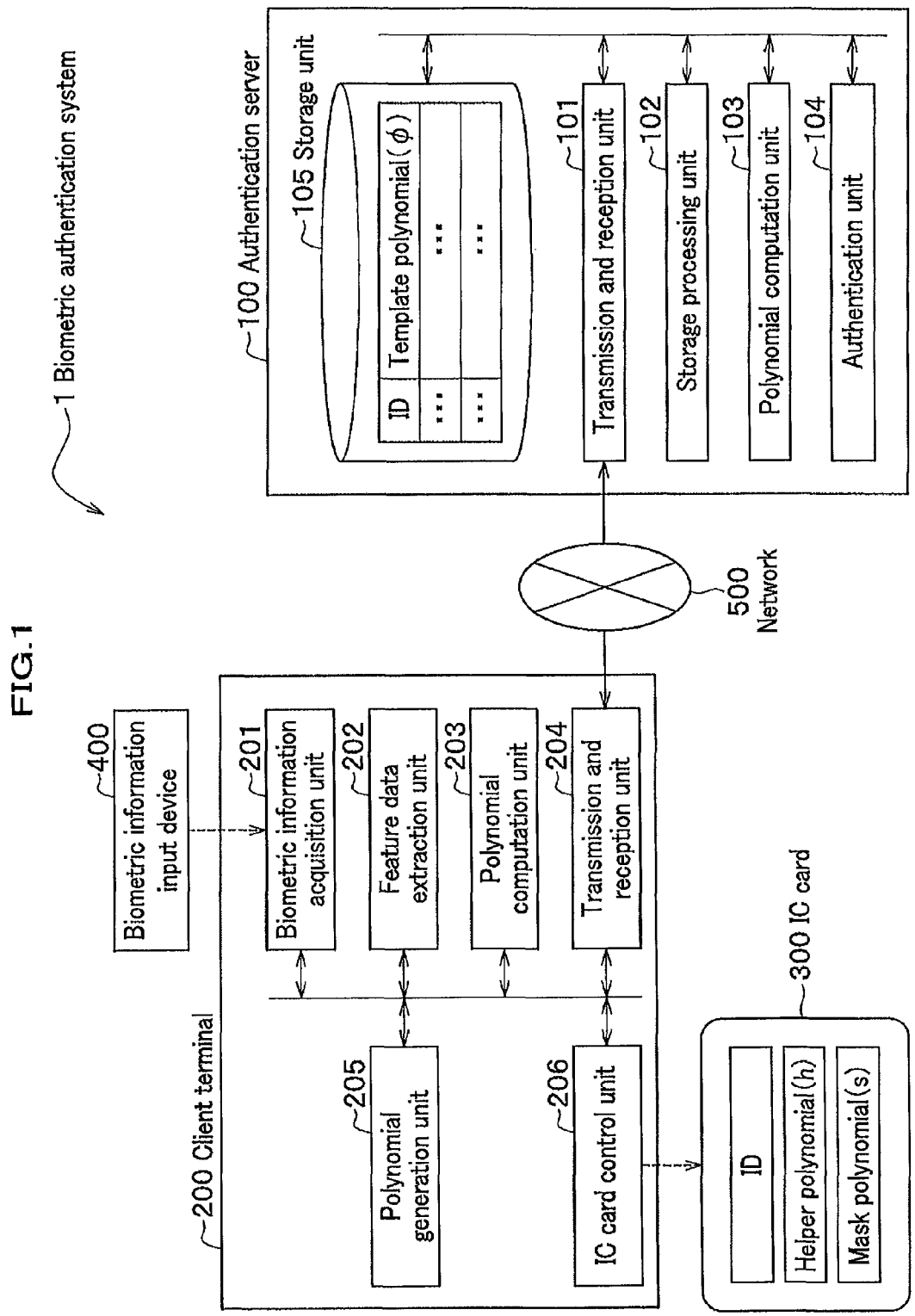
FIG. 1 is a diagram illustrating a configuration example of a biometric authentication system according to an embodiment of the present invention.

FIG. 1 is a diagram illustrating a configuration example of a biometric authentication system according to this embodiment.

The biometric authentication system 1 (which may also be referred to as a system hereinafter where appropriate) includes: a client terminal 200 that acquires biometric information, extracts a feature data, and transforms the feature data at a time of enrollment and a time of authentication; and an authentication server 100 that stores a template polynomial to be described hereinafter and performs an authentication processing and the like. The client terminal 200 and the authentication server 100 are connected to each other via a network 500 such as a VPN (Virtual Private Network). Note that, in FIG. 1, one unit of the client terminal 200 is connected to the authentication server 100. However, a plurality of units of the client terminals 200 may be connected to the authentication server 100.

The authentication server 100 includes a transmission and reception unit 101, a storage processing unit 102, a polynomial computation unit 103, an authentication unit 104, and a storage unit 105.

The transmission and reception unit 101 transmits and receives information to and from the client terminal 200.

The storage processing unit 102 stores information in the storage unit 105 and reads information from the storage unit 105.

The polynomial computation unit 103 performs computation with respect to a polynomial.

The authentication unit 104 authenticates biometric information, using the result computed by the polynomial computation unit 103.

The storage unit 105 stores therein a template polynomial ($\phi$) to be described later and a user ID (Identifier), which are associated with each other.

The client terminal 200 is connected to a biometric information input device 400 that acquires biometric information (for example, an image of iris, fingerprints, vein, or the like) from a user.

The client terminal 200 includes a biometric information acquisition unit 201, a feature data extraction unit 202, a polynomial computation unit 203, a transmission and reception unit 204, a polynomial generation unit 205, and an IC card control unit 206.

The biometric information acquisition unit 201 acquires biometric information transmitted from the biometric information input device 400.

The feature data extraction unit 202 extracts a feature data from the biometric information acquired by the biometric information acquisition unit 201 and generates a feature polynomial (to be described hereinafter) therefrom.

The polynomial computation unit 203 performs computation with respect to a polynomial.

The transmission and reception unit 204 transmits and receives information to and from the authentication server 100.

The polynomial generation unit 205 generates a polynomial other than a feature polynomial.

The IC card control unit 206 stores information in an IC card 300 as a storage medium and reads information from the IC card 300.

The IC card 300 used herein is issued for each user and stores therein an ID of the user, a helper polynomial (h), and a mask polynomial (s), the latter two to be described hereinafter, all of which are associated with each other.

For example, in a case where the biometric authentication system 1 according to this embodiment is applied to an authentication of a customer who uses a bank ATM (Automatic Teller Machine), the system 1 can have another configuration in which: the client terminal 200 and the biometric information input device 400 are serves as a bank ATM; the authentication server 100 serves as a server machine managed by the bank; and the IC card 300 serves as a cash card.

<Hardware Configuration>

Figure 2:
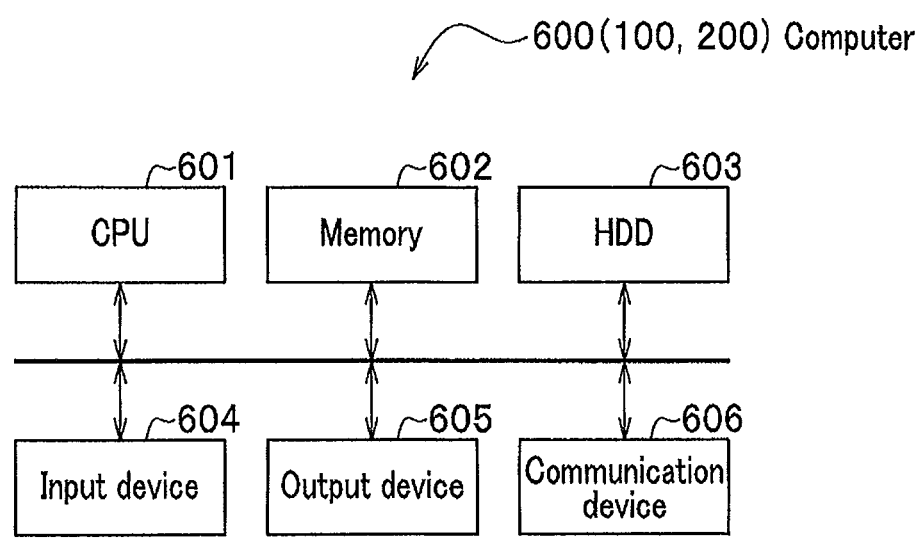
FIG. 2 is a diagram illustrating a hardware configuration of a client terminal or an authentication server according to the embodiment.

FIG. 2 is a diagram illustrating a hardware configuration of both a client terminal and an authentication server according to the embodiment.

The client terminal 200 and the authentication server 100 can be each realized by a computer 600 having the hardware configuration as shown in FIG. 2.

The computer 600 includes: a CPU (Central Processing Unit) 601; a memory 602 such as a RAM (Random Access Memory); a HDD (Hard Disk Drive) 603; an input device 604 such as a keyboard; an output device 605 such as a display; and a communication device 606 which corresponds to the transmission and reception units 101, 204 of FIG. 1.

The storage processing unit 102, the polynomial computation unit 103, and the authentication unit 104 of the authentication server 100, and the feature data extraction unit 202, the polynomial computation unit 203, and the polynomial generation unit 205 of the client terminal 200, shown in FIG. 1, are embodied when a program stored in a HDD 603 is loaded into a memory 602 and is executed by a CPU 601.

<Principles>

Below are described fundamental principles for the information authentication method in this embodiment.

The biometric information used in this embodiment is a data such as, for example, an image of fingerprints, vein, and iris. The feature data used herein is, for example, an image created by subjecting an image of fingerprints or vein to an enhancement processing and binarization (a two dimensional array of a brightness value) and a bit string of a so-called iris code created from an image of iris (a one dimensional array of $\{0, 1\}$). Let a degree of similarity between two pieces of feature data be defined as a value of mutual correlation (a value of inner product) in which such misalignment as represented below by Expression (1) or Expression (2) be allowed.

Next is described a case in which a feature data such as the iris code has one dimensional information.

$$C[u] = \sum_{i=0}^{n-1} A[i]B[i-u] \quad (|u| \le \Delta i) \tag{1}$$

Herein, each of A[i] and B[i] represents an array of a feature data (to be referred to as a one dimensional feature data hereinafter). Let a size of the array be "n".

For example, the array A[i] is defined as n elements as follows:

A[0], . . . , A[n−1]

B[i] is defined similarly.

A[i] is a feature data which is preliminarily enrolled. B[i] is a feature data which is inputted when an authentication is performed.

"u" is a misalignment position and "M." is a maximum acceptable misalignment width.

In a case where Hamming distance is applied to C[u], if C[i] is equal to or smaller than a prescribed value, an authentication of interest is regarded as having been successfully completed. Note that, in Expression (1), an array element not having been defined is assumed to take a value of "0" in calculation (for example, in a case of one dimensional array, if "i" satisfies i<u, B[i−u] is an undefined array element (that is, such a data does not exist)).

It is desirable that C[u] (=C[0]) is calculated in a state where u=0, that is, B[i] is not misaligned with A[i]. However, when biometric information is acquired, positions of A[i] and B[i] do not always match with each other because a face of interest may tilt differently at one time from another or any other reason. In light of this, C[u] is calculated with respect to a plurality of misalignment positions u. Of a plurality of the calculated C[u], the minimum C[u] is regarded as a value for use in authentication (in a case of using the Hamming distance as C[u]). Note that it is contemplated that a face tilts only within a certain range, and thus, let u be defined as |u|<Δi.

As described above, a mutual correlation array C defined by Expression (1) has 2Δi+1 elements as follows:

C[−Δi], . . . , C[Δi]

Next is described a case in which two dimensional information such as an image of vein is used as a feature data. A size of the feature data is, for example, n×m.

For example, an array A[i, j] is defined as n×m elements (to be hereinafter referred to as a two dimensional feature data) as follows:

A[0, 0], . . . , A[0, m − 1],
...
A[n − 1, 0], . . . , A[n − 1, m − 1]

B[i, j] is defined similarly.

Then, a mutual correlation array C [u, v] is defined by the following Expression (2).

$$C[u, v] = \sum_{i=0}^{n-1} \sum_{j=0}^{m-1} A[i, j]B[i-u, j-v] \quad (|u| \le \Delta i, |v| \le \Delta j) \qquad (2)$$

In Expression (2), u, v, Δi, and Δj are similarly defined as u and Δi in case of the one dimensional feature data, and description is thus omitted herefrom.

At this time, the mutual correlation array C defined by Expression (2) has (2Δi+1)×(2Δj+1) elements as follows:

C[−Δi, −Δj], . . . , C[Δi, −Δj],
...
C[−Δi, Δj], . . . , C[Δi, Δj]

In cases of both the one dimensional feature data and the two dimensional feature data, let each element of an array take an integer value. A feature image of an iris code or a vein image satisfies the above condition.

Similarly to Expression (1), in Expression (2), an array element not having been defined is assumed to take a value of "0" in calculation (for example, if i and j satisfies i<u and j<v, respectively, B[i−uj−v] is an undefined array element (that is, such a data does not exist)).

Hereinafter, A[i] and A[i, j] are collectively referred as a feature data A; and B[i] and B[i, j], as a feature data B.

As described above, the mutual correlation array C[u] (or C[u, v]) represents a value of mutual correlation (a value of inner product) in a case where the feature data B is made to correspond to the feature data A with a displacement by u (or (u, v)). In an authentication by iris, vein, fingerprints or the like, determination on a match/nonmatch can be performed based on a plurality of the obtained mutual correlation arrays C[u] (or C[u, v]).

Hereinafter, in this embodiment, C[u] as well as C[u, v] are each described as a mutual correlation array C.

Meanwhile, Br is defined below as an array created by reversing an order of the array B. This is done because, as also described later, a mutual correlation array is calculated as a coefficient of a polynomial.

Br[i]=B[n−i−1] (i=0, . . . , n−1)

Br[i, j]=B[n−i−1, m−j−1] (i=0, . . . , n−1, j=0, . . . , m−1)

Expression (1) can be thus rewritten by a convolution expression as the following Expression (3).

$$C[u] = \sum_{i=0}^{n-1} A[i]Br[n - i + u + 1] \quad (|u| \le \Delta i) \qquad (3)$$

Similarly, Expression (2) can also be rewritten by a convolution expression as the following Expression (4).

$$C[u, v] = \sum_{i=0}^{n-1} \sum_{j=0}^{m-1} A[i, j]Br[n - i + u + 1, m - j + v + 1] \qquad (4)$$

$$(|u| \le \Delta i, |v| \le \Delta j)$$

Herein, such polynomials that have each element of the arrays A and Br as respective coefficients are defined. In a case of one dimensional feature data, the polynomials are represented as Expression (5) and Expression (6). In a case of two dimensional feature data, the polynomials are represented as Expression (7) and Expression (8).

$$a(x) = \sum_{i=0}^{n-1} A[i]x^i \qquad (5)$$

$$= A[n-1]x^{n-1} + A[n-2]x^{n-2} + \ldots + A[1]x + A[0]$$

$$b(x) = \sum_{i=0}^{n-1} Br[i]x^i \qquad (6)$$

$$= Br[n-1]x^{n-1} + Br[n-2]x^{n-2} + \ldots + Br[1]x + Br[0]$$

$$a(x, y) = \sum_{i=0}^{n-1} \sum_{j=0}^{m-1} A[i, j]x^i y^j \qquad (7)$$

$$= A[n-1, m-1]x^{n-1}y^{m-1} + \ldots + A[0, m-1]y^{m-1} \vdots +$$

$$A[n-1, 0]x^{n-1} + \ldots + A[0, 0]$$

$$b(x, y) = \sum_{i=0}^{n-1} \sum_{j=0}^{m-1} Br[i, j]x^i y^j \qquad (8)$$

$$= Br[n-1, m-1]x^{n-1}y^{m-1} + \ldots + Br[0, m-1]y^{m-1} \vdots +$$

$$Br[n-1, 0]x^{n-1} + \ldots + Br[0, 0]$$

The above-described polynomials are feature polynomials of biometric information.

A polynomial created by multiplying feature polynomials a and b is a polynomial d (d=ab). A product of polynomials can be calculated using convolution of coefficient arrays. Hence, each element C[u] of the mutual correlation array C defined by Expression (3) and Expression (4) can be represented by a coefficient of the polynomial d.

The polynomial d can be expressed by Expression (9) as follows.

$$d(x) = \sum_i d_i x^i, \quad d(x, y) = \sum_{i,j} d_{i,j} x^i y^j \quad (9)$$

Hence, a relation between a coefficient of the polynomial d and an element of a mutual correlation array is represented by, in a case of one dimensional feature data, Expression (10), and, in a case of two dimensional feature data, Expression (11).

$$d_{n+u-1} = C[u] \quad (|u| \leq \Delta i) \quad (10)$$

$$d_{n+u-1, m+v-1} = C[u, v] \quad (|u| \leq \Delta i, |v| \leq \Delta j) \quad (11)$$

Therefore, in order to calculate a mutual correlation array C, just a calculation of a product d of the feature polynomials a, b is necessary. A term of the polynomial d which has the coefficient represented by Expression (10) or Expression (11) is called a set term.

In the meantime, a degree of similarity is a value of an element of the mutual correlation array represented by Expression (1) or Expression (2) (a value of mutual correlation). It is thus not necessary to calculate all coefficients of the product polynomial d. That is, although the coefficient of the polynomial d contains elements of the mutual correlation array C with respect to all "u", because the constraints of $|u| \leq \Delta i$ and $|v| \leq \Delta j$ already exist as described above, which eliminates a need of calculating elements of the mutual correlation array C with respect to all "u". Therefore, it is not necessary to calculate all coefficients of the polynomial d.

Expression (12) is hence defined as below. Note that each of α and β in Expression (12) is an arbitrary integer.

$$f(x) = x^N - \alpha, \quad g(y) = y^M - \beta \quad (N = n + \Delta i, M = m + \Delta j) \quad (12)$$

A residual polynomial below (in the case of one dimensional feature data, Expression (13), and, in the case of two dimensional feature data, Expression (14)) is calculated using Expression (12).

$$c(x) = a(x) b(x) \bmod f(x) \quad (13)$$

$$c(x, y) = a(x, y) b(x, y) \bmod \{f(x), g(y)\} \quad (14)$$

Note that a right hand side of Expression (14) represents each residual polynomial when the product polynomial, a(x, y)b(x, y), is divided by both f(x) and g(y). Hereinafter, c(x) and c(x, y) are collectively referred to as a correlation polynomial c.

A relation between a coefficient of the correlation polynomial c as the above-described residual polynomial and an element of the mutual correlation array c is represented by Expression (15) or Expression (16) (in the case of one dimensional feature data, Expression (15), and in the case of two dimensional feature data, Expression (16)). Each of the coefficients represented by Expression (15) and Expression (16) is a coefficient of a set term of the correlation polynomial c.

$$c_{n+u-1} = C[u] \quad (|u| \leq \Delta i) \quad (15)$$

$$c_{n+u-1, m+v-1} = C[u, v] \quad (|u| \leq \Delta i, |v| \leq \Delta j) \quad (16)$$

Herein, $c_k$ represents a coefficient of the term $x^k$ in the correlation polynomial c. Similarly, $c_{k,t}$ represents a coefficient of the term $x^k y^t$ in the correlation polynomial c.

Further, a definition ring of a coefficient of each polynomial can be replaced by not an integer ring Z but a residue ring Zq (a set of a remainder when an integer is divided by q), which takes an integer value. Herein, let q be a given integer, and a representative of the residue ring Zq is represented as Expression (17).

$$\{<-(q-1)/2>, <-(q-3)/2>, \ldots, -1, 0, 1, \ldots, <(q-3)/2>, <(q-1)/2>\} \quad (17)$$

Herein, <k> is a maximum integer which does not exceed k (that is, an integer portion of k).

Let q take a sufficiently large value such that |(q−1)/2| be equal to or more than a maximum value of an absolute value of a value of each element of the mutual correlation array C (that is, each value of a degree of similarity). Then, even if a coefficient of a polynomial is replaced by Zq, a coefficient of the correlation polynomial c as a product polynomial calculated by Expression (13) or Expression (14) remains unchanged, and the mutual correlation array C can be calculated correctly.

Herein, a residual polynomial ring R represented by Expression (18) or Expression (19) is defined as below (in the case of one dimensional feature data, Expression (18), and, in the case of two dimensional feature data, Expression (19)).

$$R = Z_q[x]/(f(x)) \quad (18)$$

$$R = Z_q[x, y]/(f(x), g(y)) \quad (19)$$

Herein, $Z_q[x]$ and $Z_q[x, y]$ are each a set of polynomials having an element of the residue ring $Z_q$ as a coefficient.

If all polynomials are regarded as elements of the residual polynomial ring R, the correlation polynomial c represented by Expression (13) or Expression (14) can be represented by Expression (20) as follows:

$$c = ab (c, a, b \in R) \quad (20)$$

Hereinafter, computation is performed assuming that the polynomials used in this embodiment are all elements of the residual polynomial ring R, if not otherwise specified.

Figure 3:
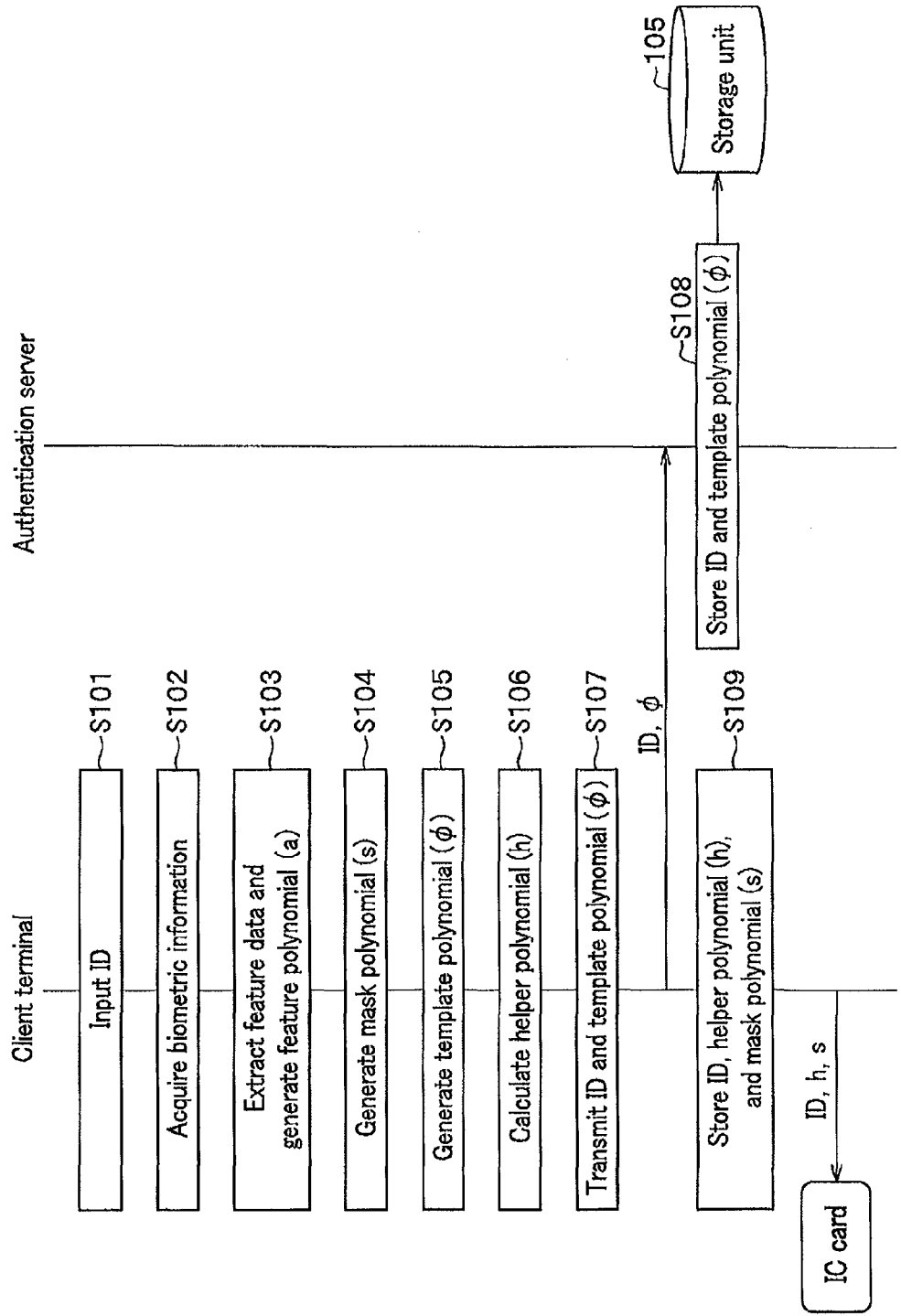
FIG. 3 is a flowchart illustrating steps of an enrollment processing according to the embodiment.

Based on the above-described preliminary discussions, next is described a method of realizing cancellable biometrics according to this embodiment, with reference to FIG. 1 as well as FIG. 3 and FIG. 4 where appropriate. In order to realize cancellable biometrics, what is necessary is just that the mutual correlation array C can be calculated while the feature polynomials a, b are kept secret.

<At Time of Enrollment>

A calculation process at a time of enrollment is shown below.

At the time of enrollment, the client terminal 200 uniformly randomly generates a polynomial φ∈R that satisfies the following "condition 1" to "condition 3", and an arbitrary polynomial s∈R.

Condition 1: A norm (a maximum value of an absolute value of a coefficient) is small (equal to or smaller than a prescribed value δ).

Condition 2: The number of non-zero coefficients is equal to or smaller than a prescribed number L (for example, L=N/2: however, L is not limited to this value).

Condition 3: A residual polynomial ring R has an inverse with respect to multiplication. That is, a polynomial φ⁻∈R exists in which φφ⁻¹=1. Herein, a polynomial which corresponds to the inverse is referred to as an inverse polynomial. That is, the inverse polynomial is a polynomial which is modulo a given integer and a given polynomial is an inverse with respect to a modular multiplication of a polynomial.

Also, let norms of the feature polynomials a, b be small (equal to or smaller than a prescribed value δ'). This condition can be easily realized in an image, a code, or the like. Then, the client terminal 200 calculates a polynomial h as below, using a feature polynomial a of biometric information for enrollment, the above-described template polynomial φ, and a mask polynomial s.

$$h = (s+pa)\phi^{-1} \quad (21)$$

Herein, p is a prescribed integer.

Hereinafter, h is referred to as a helper polynomial.

The client terminal 200 stores the helper polynomial h and the mask polynomial s in a storage part thereof not shown or in an IC card 300 or the like, and issues the polynomials h, to a user. The client terminal 200 transmits the template polynomial φ to the authentication server 100. The authentication server 100 stores the transmitted template polynomial φ in the storage unit 105 thereof.

The template polynomial φ is randomly generated regardless of the feature polynomial a. Any biometric information cannot be restored from the template polynomial φ. Moreover, even if the helper polynomial h or the mask polynomial s is leaked from the client terminal 200, it is believed to be difficult to identify the feature polynomial a therefrom.

In fact, in the case of one dimensional feature data, for example, consider that, in Expression (21), the mask polynomial s=0, and α=1 in h=paφ$^{-1}$ (s=0 in Expression (12)) (that is, f(x)=x$^N$−1 in Expression (12)). The helper polynomial h then takes a form same as a public key of the well-known NTRU cryptography (see J. Hoffstein, J. Pipher and J. H. Silverman, NTRU: A Ring-Based Public Key Cryptosystem. Algorithmic Number Theory (ANTS III), Portland, Oreg., June 1998, J. P. Buhler (ed.), LNCS 1423, Springer-Verlag, Berlin, 267-288, 1998). Further, the feature polynomial a or the template polynomial φ corresponds to a private key of NTRU cryptography.

Estimation of a private key from a public key in NTRU cryptography is believed to be as difficult as solving a certain type of lattice problem (SVP (Shortest Vector Problem) in the NTRU lattice).

Description herein has been made assuming a case in which the mask polynomial s=0, and α=1. Even under conditions other than the above, the cancelable biometrics according to this embodiment ensures security at a level as high as that of the NTRU cryptography.

<At Time of Authentication>

Next is described a calculation process at a time of authentication.

At the time of authentication, the client terminal 200 uniformly randomly generates a polynomial ε∈R that satisfies the above-described "condition 1". Further, the client terminal 200 uniformly randomly generates: a polynomial ψ that satisfies the above-described "condition 1" and "condition 2"; and a polynomial r∈R that satisfies "condition 4" to be described hereinafter (Expression (22) shown below represents the case of one dimensional feature data, and, Expression (23), the case of two dimensional feature data). The polynomials ψ, r are collectively referred to as a random polynomial (the random polynomial ψ may also be referred to as a first random polynomial, and the random polynomial r, a second random polynomial).

"Condition 4"

$$r_{n+u-1} = \epsilon_{n+u-1} \quad (|u| \leq \Delta i) \quad (22)$$

$$r_{n+u-1, m+v-1} = \epsilon_{n+u-1, m+v-1} \quad (|u| \leq \Delta i, |v| \leq \Delta j) \quad (23)$$

Herein, $r_k$ represents a coefficient of a term of $x^k$ in the random polynomial r, and $\epsilon_k$ represents a coefficient of a term of $x^k$ in a polynomial ε. Similarly, $r_{k,t}$ represents a coefficient of a term of $x^k y^t$ in the random polynomial r, and $\epsilon_{k,t}$ represents a coefficient of a term of $x^k y^t$ in the polynomial ε.

The "condition 4" concerning the polynomial r means that, a coefficient in some cases (a coefficient which is restricted by Expression (22) or Expression (23): that is, a coefficient corresponding to a set term) is equal to a coefficient of ε (that is, an absolute value thereof is equal to or smaller than a prescribed value δ), and a coefficient in the other cases uniformly randomly take any element of Zq.

Herein, consider a case where: information for enrollment and information for authentication are each one dimensional information with an array n; a feature data A as a first feature data and a feature data B as a second feature data are each a one dimensional array with a size n; and the number of degrees of similarity to be calculated is 2Δi+1. Then, the feature polynomial a and the feature polynomial b are each a one-variable n-th degree polynomial. The random polynomial r is also a one-variable polynomial with a degree equal to or smaller than n+Δi−1 (=N−1).

Further, consider a case where: information for enrollment and information for authentication are each two dimensional information with the number of arrays of n×m; a feature data A as a first feature data and a feature data B as a second feature data are each a two dimensional array with a size n×m; and the number of degrees of similarity to be calculated is (2Δi+1)× (2Δj+1). Then, the feature polynomial a and the feature polynomial b are each a two variable polynomial with one n-th variable and the other m-th variable. The random polynomial r is also a two variable polynomial. An order of one variable is equal to or smaller than n+Δi−1 (=N−1). An order of the other variable is equal to or smaller than n+Δi−1 (=M−1).

The client terminal 200 then: acquires biometric information of a user; reads the helper polynomial h and the mask polynomial s stored in the IC card 300; and calculates the following with respect to the feature polynomial b corresponding to the biometric information.

$$v = hb + \psi, w = sb - r \quad (24)$$

The client terminal 200 transmits the calculated v, w (to be each referred to as an authentication polynomial) to the authentication server 100 (the authentication polynomial v may also be referred to as a first authentication polynomial, and, the authentication polynomial w, a second authentication polynomial).

Upon receipt of the authentication polynomials v, w, the authentication server 100 calculates a correlation polynomial c″ as follows, using φ stored in the storage unit 105.

$$\begin{aligned} c'' &= v\varphi - w \\ &= (hb + \psi)\varphi - (sb - r) \\ &= (s + pa)b + \psi\varphi - sb + r \\ &= pab + \psi\varphi + r \end{aligned} \quad (25)$$

At the time of enrollment, the prescribed integer q is already set to a value equal to or larger than the maximum possible value that a norm of the correlation polynomial c″ can take. Thus, the equalities of Expression (25) hold, even when each coefficient is regarded as an element of the integer ring Z (which is not the residue ring Zq). The authentication server 100 then: takes the coefficient of the correlation polynomial c″ as an element of the integer ring Z; as shown below, divides the each coefficient by the prescribed integer p; and rounds the obtained quotient to an integer, to thereby calculate the correlation polynomial c′.

$$c' = \langle c''/p \rangle = ab + \langle (\psi\varphi + r)/p \rangle \quad (26)$$

Herein, <k> indicates that a polynomial k is a polynomial in which a value of each coefficient thereof is a maximum integer that does not exceed the coefficient (that is, a polynomial which has, as a coefficient thereof, an integer portion of each coefficient of the polynomial k). Note that the prescribed integer p used in Expression (21) at the time of enrollment needs to be the same as the prescribed integer p used in Expression (26) at the time of authentication. Thus, for example, when the client terminal 200 transmits the template polynomial $\phi$ to the authentication server 100 at the time of enrollment, the client terminal 200 may also transmit the prescribed integer p together, and authentication server 100 may store the prescribed integer p together with the template polynomial $\phi$ in the storage unit 105. Or, the same value of p may be used for all authentication processings.

Herein, consider e which is created by replacing r of $<(\psi\phi+r)/p>$ in Expression (26) with $\epsilon$.

$$e=<(\psi\phi+\epsilon)/p> \quad (27)$$

Herein, r satisfies the above-described "condition 4", and at the same time, ab=c. Thus, the following Expressions hold (Expression (28) in the case of one dimensional feature data and Expression (29) in the case of two dimensional feature data).

$$c'_{n+u-1}=c_{n+u-1}+e_{n+u-1} \ (|u|\le\Delta i) \quad (28)$$

$$c'_{n+u-1, m+v-1}=c_{n+u-1, m+v-1}+e_{n+u-1, m+v-1} \ (|u|\le\Delta i, |v|\le\Delta j) \quad (29)$$

Herein, $e_k$ indicates a coefficient of a term of $x^k$ of a polynomial e, and $e_{k,t}$ indicates a coefficient of a term of $x^k y^t$ of the polynomial e.

Meanwhile, both of the polynomials $\psi$, $\phi$ satisfy "condition 1" and "condition 2". Thus, a norm of a product polynomial $\psi\phi$ is always equal to or smaller than $L\delta^2$. Actually, the norm takes a value smaller than $L\delta^2$ in many cases. Further, because the norm of the polynomial $\epsilon$ is small according to "condition 1", an appropriate selection of p can make the norm of e arbitrarily small. Therefore, instead of the correlation polynomial c, a coefficient of the correlation polynomial c' can be used for calculation of a degree of similarity (a value of mutual correlation) of the feature data arrays A, B. If p is made to take a large value, then $e=<(\psi\phi+\epsilon)/p>=0$, that is, an integer portion of a coefficient in a set term of e can be made to be 0. This eliminates an error between the correlation polynomial c' and the correlation polynomial c. As a result, accuracy of authentication can be achieved at a level completely same as that in a case where a degree of similarity is calculated and determined based on Expression (1) and Expression (2).

On the other hand, if p is made to take a small value, then $e=<(\psi\phi+\epsilon)/p>\ne 0$. That is, an integer portion of a coefficient in a set term of e is not 0. This brings about an error between c' and c. As a result, accuracy of authentication is decreased. However, because q can be set to a small value, a size of a data (h, s) stored in the client terminal 200 or a data (v, w) transmitted to the authentication server 100 at the time of authentication can be reduced.

If Hamming distance is used in a mutual correlation array (that is, if exclusive OR is used in a bit operation between A and B), and if the smallest value of $c'_{n+u-1}$ or $c'_{n+u-1, m+v-1}$ is equal to or smaller than a preset threshold, the authentication server 100 determines that an authentication of interest has been successfully performed.

The information authentication method according to this embodiment can prevent an attacker from attacking a system in an attempt to estimate the feature polynomial b on a basis of the authentication polynomials v, w.

In fact, in the case of one dimensional feature data, for example, given $\alpha=1$ in Expression (12) (that is, given $f(x)=x^N-1$), v takes a form same as a cryptogram of the NTRU cryptography (in this case, the helper polynomial h is regarded as a public key, and, the random polynomial $\psi$, as a plaintext). Suppose that the attacker is aware of h for some reason. Finding the feature polynomial b from the authentication polynomial v is equivalent to finding the random polynomial $\psi$ from the authentication polynomial v (if one of the two is found, the other can be found). This is equivalent to finding a plaintext from a cryptogram of the NTRU (without knowing a private key), which is believed to be as difficult as solving a certain type of lattice problem (CVP in the NTRU lattice).

The helper polynomial h is stored in the IC card 300 and is safely managed by a user, thus not allowing the attacker to know the helper polynomial h. This means that the finding of the feature polynomial b from the authentication polynomial v is even more difficult than decryption of the NTRU. For the same reason, finding of the feature polynomial b from the authentication polynomial w is believed to be still more difficult than the decryption of the NTRU.

This is same as in a case that $\alpha\ne 1$.

Further, it is also difficult for a malicious user to estimate the feature polynomials a, b from information obtained in a course of calculating a degree of similarity (a value of mutual correlation), for example, the correlation polynomial c" in Expression (25). In fact, the right hand side of Expression (25) contains an addition of the random polynomial r. In the random polynomial r, a coefficient other than the coefficient specified in "condition 4" uniformly randomly takes an arbitrary element of the residue ring Zq. Thus, a corresponding coefficient value of the correlation polynomial c" is also uniformly randomly distributed (that is, transformed into noise), from which any information on a coefficient corresponding to the product polynomial ab cannot be obtained. Therefore, all of the information on the feature polynomials a, b that the malicious user can obtain are only Expression (28) and Expression (29) (note that c=ab in Expression (20)), which is minimum required information in order for the authentication server 100 to calculate a degree of similarity between the feature data A, B. In this embodiment, information other than the above is kept from leaking outside, which makes it possible to ensure security at a high level against an attack from a malicious user trying to fraudulently restore original biometric information.

<Flowcharts>

Next are described calculation steps as described above with reference to flowcharts shown in FIG. 3 and FIG. 4, as well as FIG. 1.

<Registration Processing>

FIG. 3 is a flowchart illustrating steps of an enrollment processing according to this embodiment.

A user inputs an ID (Identification) of his/her own into the client terminal 200 via an input part thereof not shown (S101).

The biometric information acquisition unit 201 acquires biometric information for enrollment via the biometric information input device 400 (S102).

The feature data extraction unit 202 extracts a feature data from the inputted biometric information for enrollment and generates a feature polynomial (a) (S103).

The polynomial generation unit 205 generates a uniformly-random mask polynomial (s) on a residual polynomial ring R (S104).

The polynomial generation unit 205 uniformly randomly generates a template polynomial (φ) which satisfies the above-described "condition 1", "condition 2", and "condition 3" (S105).

The polynomial computation unit 203 performs computation of Expression (21) and calculates a helper polynomial (h) (S106).

The transmission and reception unit 204 of the client terminal 200 transmits the ID and the template polynomial (φ) to the authentication server 100 (S107).

Upon receipt of the ID and the template polynomial (φ), the storage processing unit 102 of the authentication server 100 stores the ID and the template polynomial (φ) received, as paired information, in the storage unit 105 (S108).

Meanwhile, the IC card control unit 206 of the client terminal 200 stores the ID, the helper polynomial h, and the mask polynomial s, in the IC card 300 (S109), based on which the IC card control unit 206 issues an IC card 300 to the user.

<Authentication Processing>

FIG. 4 is a flowchart illustrating steps of an authentication processing according to this embodiment.

The client terminal 200 reads the ID, the helper polynomial (h), and the mask polynomial (s) from the IC card 300 via the IC card control unit 206 (S201).

The biometric information acquisition unit 201 acquires biometric information for authentication via the biometric information input device 400 (S202).

The feature data extraction unit 202 extracts a feature data from the acquired biometric information for authentication, based on which the feature data extraction unit 202 generates a feature polynomial (b) (S203).

The polynomial generation unit 205: uniformly randomly generates a random polynomial (ψ) which satisfies the above-described "condition 1" and "condition 2"; uniformly randomly generates a polynomial ε∈R which satisfies the "condition 1"; and uniformly randomly generates a random polynomial (r∈R) which satisfies the "condition 4" (S204).

The polynomial computation unit 203 then performs computation of the above-described Expression (24) and calculates the authentication polynomial (v, w) (S205).

The transmission and reception unit 204 of the client terminal 200 transmits the ID read in step S201 and the authentication polynomial (v, w), as paired information, to the authentication server 100 (S206).

Upon receipt of the ID and the authentication polynomial (v, w), the storage processing unit 102 of the authentication server 100 reads a template polynomial (φ) corresponding to the received ID, from the storage unit 105, using the received ID as a key (S207).

The polynomial computation unit 103 performs computation of the above-described Expression (25) and Expression (26) and calculates the correlation polynomial (c') (S208).

The authentication unit 104 then calculates a degree of similarity between feature data, based on the correlation polynomial (c') (S209). More specifically, if Hamming distance is used as a value of mutual correlation, a coefficient ($c'_{n+u-1}$, $c'_{n+u-1, m+v-1}$) of the correlation polynomial (c') is taken as a degree of similarity. From among the obtained plural degrees of similarity, the smallest value is extracted.

The authentication unit 104 determines a match/nonmatch between the biometric information for enrollment and the biometric information for authentication, based on the calculated degree of similarity (S210). More specifically, the authentication unit 104 determines whether or not the smallest value from among the degrees of similarity calculated in step S209 is equal to or smaller than a preset threshold. If the smallest value is equal to or smaller than the threshold, the authentication unit 104 determines a match therebetween. If the smallest value is larger than the threshold, the authentication unit 104 determines a nonmatch therebetween (in a case where the Hamming distance is used as the value of mutual correlation).

In this embodiment, the mutual correlation array and the correlation polynomials c", c' are not normalized. However, those values may be normalized. In the case of one dimensional feature data, normalization can be performed by dividing each array value of the mutual correlation array or each coefficient of the correlation polynomial c' (or c") by n−|u|. Alternatively, when the authentication polynomials v, w are calculated in step S205 of FIG. 4, the polynomial computation unit 203 may divide v, w by n−|u|.

In the case of two dimensional feature data, normalization can be performed by dividing each array value of the mutual correlation array or each coefficient of the correlation polynomial c'(or c") by (n−|u|)(m−|v|). Alternatively, when the authentication polynomials v, w are calculated in step 205 of FIG. 4, the polynomial computation unit 203 may divide v, w by (n−|u|)(m−|v|).

In this embodiment, the helper polynomial (h) and the mask polynomial (s) are stored in the IC card 300 as a storage medium. However, the present invention is not limited to this. The polynomial (h) and (s) may be stored in an internal HD, an external HD, a USB (Universal Serial Bus) memory, or the like of the client terminal 200.

Further, this embodiment is applied to authentication of biometric information. However, this embodiment is not limited to this. This embodiment can be applied to, for example, a password.

<Overview>

In this embodiment, the authentication server 100 stores therein the template polynomial φ which is randomly generated regardless of the feature polynomial (a), while advantageous characteristics of cancelable biometrics are maintained in which one piece of biometric information of a user can be applied to using a plurality of templates. The user can keep his/her biometric information secret from a server administrator of the authentication server 100. This can prevent the biometric information from leaking from the authentication server 100. In particular, high-level security can be ensured even against such an advanced attack that a malicious server administrator fraudulently attempts to estimate the biometric feature data a of the user.

Additionally, in this embodiment, information transmitted to the authentication server 100 at the time of authentication is subjected to the random polynomial r or the like. This allows a coefficient value as a computation result at the authentication server 100 to be uniformly randomly distributed. Thus, all that a server administrator can know is only Expression (28) and Expression (29), which are information minimum required for obtaining a value of mutual correlation of the feature data A, B. This ensures high-level confidentiality.

Further, in this embodiment, security of the feature polynomials a, b against a wiretapper of the communication channel, a malicious server administrator, or the like is as high as or higher than the well-known NTRU cryptography. Thus, the biometric authentication system 1 can be built which has high-level security against a risk of leakage of biometric information.

DESCRIPTION OF REFERENCE NUMERALS 1 biometric authentication system (information authentication system)

100 authentication server
101 transmission and reception unit
102 storage processing unit
103 polynomial computation unit (authentication server)
104 authentication unit
105 storage unit
200 client terminal
201 biometric information acquisition unit
202 feature data extraction unit
203 polynomial computation unit
204 transmission and reception unit
205 polynomial generation unit
206 IC card control unit
300 IC card (storage medium)
400 biometric information input device

The invention claimed is:

1. An information authentication method to authenticate information performed by a client terminal and an authentication server, comprising:
at a time of enrollment,
the steps, performed by the client terminal, of
acquiring information for enrollment via an input unit;
generating a first feature polynomial based on the information for enrollment;
generating a template polynomial that has an inverse polynomial which is modulo a prescribed integer and a prescribed polynomial and which is an inverse with respect to a modular multiplication of a polynomial, and that has a norm equal to or smaller than a preset value;
calculating a helper polynomial by multiplying the first feature polynomial by the inverse polynomial of the template polynomial and a prescribed integer;
storing the helper polynomial in a storage part of the client terminal and transmitting the template polynomial to the authentication server; and
the step, performed by the authentication server upon receipt of the template polynomial, of
storing the received template polynomial in a storage medium; and,
at a time of authentication,
the steps, performed by the client terminal, of,
acquiring information for authentication via the input part;
generating a second feature polynomial based on the information for authentication;
generating a first random polynomial which has a norm equal to or smaller than a preset value;
calculating a first authentication polynomial by multiplying the helper polynomial by the second feature polynomial and adding the first random polynomial to a multiplication result;
transmitting the first authentication polynomial to the authentication server; and
the steps, performed by the authentication server upon receipt of the first authentication polynomial, of,
multiplying the first authentication polynomial by the inverse polynomial of the template polynomial and dividing the multiplication result by the prescribed integer; and
determining a match or a nonmatch between the information for enrollment and the information for authentication, based on a division result.

2. An information authentication method to authenticate information performed by a client terminal and an authentication server, comprising:
at a time of enrollment,
the steps, performed by the client terminal, of
acquiring information for enrollment via an input unit;
generating, based on the information for enrollment, a first feature polynomial a which features the information for enrollment;
generating a mask polynomial s randomly;
generating a template polynomial $\phi$ that has an inverse polynomial which is modulo a prescribed integer and a prescribed polynomial and which is an inverse with respect to a modular multiplication of a polynomial, and that has a norm equal to or smaller than a preset value;
calculating a helper polynomial $h=(s+pa)*\phi-1$ by adding a product of a prescribed integer p and the first feature polynomial a to the mask polynomial s, and further multiplying the addition result by the inverse polynomial $\phi-1$ of the template polynomial $\phi$;
storing the calculated helper polynomial h and the mask polynomial s in a storage medium of the client terminal;
transmitting the template polynomial $\phi$ to the authentication server; and
the step, performed by the authentication server upon receipt of the template polynomial $\phi$, of,
storing the received template polynomial $\phi$ in a storage medium; and,
at a time of authentication,
the steps, performed by the client terminal, of,
acquiring information for authentication via the input part;
generating, based on the information for authentication, a second feature polynomial b which features the information for authentication;
generating a first random polynomial which has a norm equal to or smaller than a preset value;
calculating an authentication polynomial $v=hb+\psi$ and $w=sb$;
transmitting the calculated authentication polynomials v, w to the authentication server; and
the steps, performed by the authentication server upon receipt of the authentication polynomials v, w, of,
acquiring the template polynomial $\phi$ from the storage medium;
calculating a polynomial of $c''=v\phi-w$, dividing the polynomial c'' by the prescribed integer p, and calculating a polynomial c' by extracting an integer portion of each coefficient of a set term; and
taking each coefficient of the set term from among c' as a degree of similarity, comparing the degree of similarity with a preset threshold, and thereby determining a match or a nonmatch between the information for enrollment and the information for authentication.

3. An information authentication method in to authenticate information performed by a client terminal and an authentication server, comprising:
at a time of enrollment,
the steps, performed by the client terminal, of
acquiring information for enrollment via an input unit;

generating, based on the information for enrollment, a first feature data which is an array featuring the information for enrollment;

generating a first feature polynomial a which is a polynomial having each array of the feature data as a coefficient;

generating a mask polynomial s randomly;

generating a template polynomial $\phi$ that has a norm which is a maximum value of an absolute value of a coefficient is equal to or smaller than a prescribed value, has a number of non-zero coefficients equal to or smaller than a prescribed number, and has a polynomial as an inverse;

calculating a helper polynomial $h=(s+pa)\phi-1$ using a prescribed integer p;

storing the helper polynomial h and the mask polynomial s in a storage unit and transmitting the template polynomial $\phi$ to the authentication server;

the step, performed by the authentication server upon receipt of the template polynomial $\phi$, of
storing the received template polynomial $\phi$ in a storage medium; and, at a time of authentication,
the steps, performed by the client terminal, of
acquiring information for authentication via the input part;

generating, based on the information for authentication, a second feature data which is an array featuring the information for authentication;

generating a second feature polynomial b which is a polynomial having each array of the feature data as a coefficient;

generating a random polynomial $\psi$ that has a norm which is a maximum value of an absolute value of a coefficient equal to or smaller than a prescribed value, and has a number of non-zero coefficients equal to or smaller than a prescribed number;

generating a random polynomial r that has a random finite value as a coefficient, although a value of a coefficient of a set term which is a term previously set takes a random finite value equal to or smaller than a prescribed value, and that is different from the random polynomial $\psi$;

calculating authentication polynomials $v=hb+\psi$ and $w=sb-r$;

transmitting the calculated authentication polynomials v, w to the authentication server; and the steps, performed by the authentication server upon receipt of the authentication polynomials v, w, of
acquiring the template polynomial $\phi$ from the storage medium;

calculating a polynomial of $c''=v\phi-w$, dividing the polynomial c'' by the prescribed integer p, and calculating a polynomial c' by extracting an integer portion of each coefficient of a set term; and taking the each coefficient of the set term from among c' as a degree of similarity, comparing the degree of similarity with a preset threshold, and thereby determining a match or a nonmatch between the information for enrollment and the information for authentication.

4. The information authentication method according to claim 3,
wherein the prescribed integer p takes such a value that an integer portion of a value of a coefficient at least in the set term from among coefficients in $(\psi\phi+r)/p$ becomes 0.

5. The information authentication method according to claim 3,
wherein the prescribed integer p takes such a value that an integer portion of at least one coefficient in a set term in $(\psi\phi+r)/p$ becomes 1 or larger.

6. The information authentication method according to claim 3,
wherein each of the information for enrollment and the information for authentication is one dimensional information with an array n, and wherein, if each of the first feature data a and the second feature data b is a one dimensional array with a size n and if the number of the degrees of similarity to be calculated is $2\Delta i+1$, then the first feature polynomial a and the second feature polynomial b are each a one-variable n-th degree polynomial, and the random polynomial r is a one-variable polynomial with a degree of the variable equal to or smaller than $n+\Delta i-1$.

7. The information authentication method according to claim 6,
wherein each of the first feature data and the second feature data is an iris code.

8. The information authentication method according to claim 3,
wherein each of the information for enrollment and the information for authentication is two dimensional information with a number of arrays n×m, and
wherein, if each of the first feature data and the second feature data is a two dimensional array with a size n×m and if the number of the degrees of similarity to be calculated is $(2\Delta i+1)\times(2\Delta j+1)$, then the first feature polynomial a and the second feature polynomial b are two variable polynomials in each of which a degree of one of the variables is n, and a degree of the other is m, and the random polynomial r is a two variable polynomial with a degree of one of the variables equal to or smaller than $n+\Delta i-1$ and a degree of the other equal to or smaller than equal to or smaller than $n+\Delta j-1$.

9. The information authentication method according to claim 8,
wherein each of the information for enrollment and the information for authentication is a vein image.

10. An information authentication system, comprising:
a client terminal computer, the client terminal computer comprising:
a storage unit;
a transmission/reception unit;
a processor and a memory, wherein the memory has instructions that when executed on the processor instruct the processor to provide:
an input unit that acquires information for enrollment from an input device coupled to the input unit;
a data extraction unit;
a polynomial computation unit; and
a polynomial generation unit;
an authentication server, the authentication server comprising:
a storage unit;
a transmission/reception unit;
a memory and a processor, wherein the memory has instructions that, when executed on the processor, instruct the processor to provide:
a polynomial computation unit; and
an authentication unit,
wherein, for the client terminal computer, at a time of enrollment:

the input unit acquires information for enrollment from the input device;

the data extraction unit generates a first feature polynomial based on the information for enrollment;

the polynomial generation unit generates a template polynomial, the template polynomial being a polynomial that has an inverse polynomial which is modulo a prescribed integer and a prescribed polynomial and which is an inverse with respect to a modular multiplication of a polynomial, and that has a norm equal to or smaller than a preset value;

the polynomial computation unit calculates a helper polynomial by: multiplying the first feature polynomial by a prescribed integer and further multiplying the multiplied first feature polynomial by the inverse polynomial of the template polynomial;

the helper polynomial is stored in the storage unit; and the transmission/reception unit transmits the template polynomial to the authentication server;

wherein, for the client terminal computer at a time of authentication:

the input unit acquires information for authentication via the input device;

the data extraction unit generates a second feature polynomial based on the information for authentication;

the polynomial generation unit generates a first random polynomial which has a norm equal to or smaller than a preset and calculates a first authentication polynomial by multiplying the helper polynomial by the second feature polynomial and adds the first random polynomial to a multiplication result; and the transmission/reception unit transmits the first authentication polynomial to the authentication server;

wherein for the authentication server, at the time of enrollment:

the transmission/reception unit receives the template polynomial from the client terminal computer, and the received template polynomial is stored in a storage unit;

wherein, for the authentication server at the time of authentication:

the polynomial computation unit, upon receipt of the first authentication polynomial from the client terminal, multiplies the first authentication polynomial by the inverse polynomial of the template polynomial and dividing the multiplication result by the prescribed integer; and the authentication unit determines a match or a non-match between the information for enrollment and the information for authentication, based on the division result.

* * * * *